Dec. 15, 1959   C. H. PHILLIPS   2,917,126
DRIVING CONTROL SAFETY MECHANISM FOR TRACTORS
Filed April 4, 1957   2 Sheets-Sheet 1

Clovis H. Phillips
INVENTOR.

Dec. 15, 1959   C. H. PHILLIPS   2,917,126
DRIVING CONTROL SAFETY MECHANISM FOR TRACTORS
Filed April 4, 1957   2 Sheets-Sheet 2

Clovis H. Phillips
INVENTOR.

United States Patent Office 2,917,126
Patented Dec. 15, 1959

2,917,126

DRIVING CONTROL SAFETY MECHANISM FOR TRACTORS

Clovis H. Phillips, Florence, Ala., assignor of one-half to Nolan Phillips, Florence, Ala.

Application April 4, 1957, Serial No. 650,748

3 Claims. (Cl. 180—82)

This invention relates to a safety device for tractors and other vehicles and more particularly to a means for preventing a tractor from turning over backwards or sideways.

The primary object of the present invention resides in the provision of means for changing or shifting the center of balance of a tractor or other machine which may be changed when the machine has a load too heavy to pull causing the front end of the tractor to raise off the ground or when it is used on a rather steep side grade or the like.

The construction of this invention features the utilization of mercury switches mounted on the vehicle which when tilted complete operative electrical circuits to solenoids controlling the clutch and brake actuating mechanisms of the tractor.

Still further objects and features of this invention reside in the provision of a safety device for tractors and like vehicles that is simple in construction, easy to install, and capable of preventing accidents which may cause injury or death to the operator of the vehicle and extensive damage to tractors and like equipment.

These, together with the various ancillary objects and features of the invention which will become apparent as the following description proceeds, are attained by this safety device for tractors, a preferred embodiment of which has been illustrated in the accompanying drawing, by way of example only, wherein.

Figure 2:
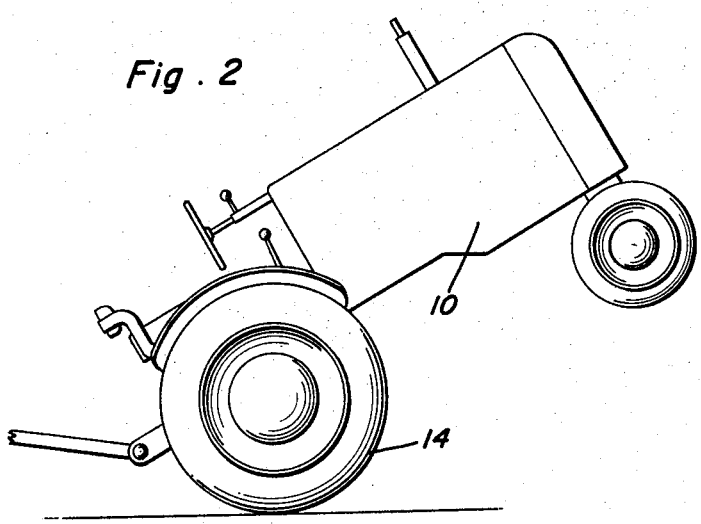
Figure 2 is an elevational view of a tractor shown pulling a load too heavy for the tractor so as to cause the tractor to tilt.
Figure 4:
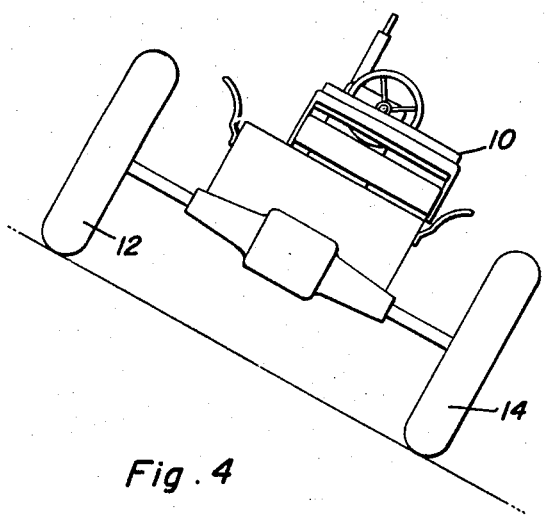
Figure 4 is an elevational view illustrating a tractor operating on a steep side bank.
Figure 5:
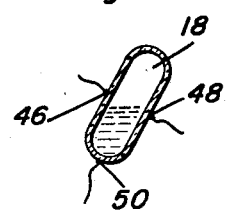
Figure 5 is a schematic view illustrating the position of a mercury switch used for controlling the brakes of a tractor and shown in a tilted position when the vehicle is operating on a steep bank.

With continuing reference to the accompanying drawings wherein like reference numerals designate similar parts throughout the various views, reference numeral 10 generally designates a tractor of conventional construction which is provided with rear drive wheels 12 and 14. The tractor is adapted for many uses and it is noted when the tractor pulls a load too heavy for the tractor the front end will tilt upwardly, perhaps dangerously as is shown in Figure 2. In order to overcome the dangers from such operation and also from an operation such as shown in Figure 4 when the vehicle is being propelled along a steep bank or the like, there is provided a pair of mercury switches 18 and 20. These mercury switches are mounted on any suitable portion of the vehicle and are adapted to tilt with the vehicle.

Figure 1:
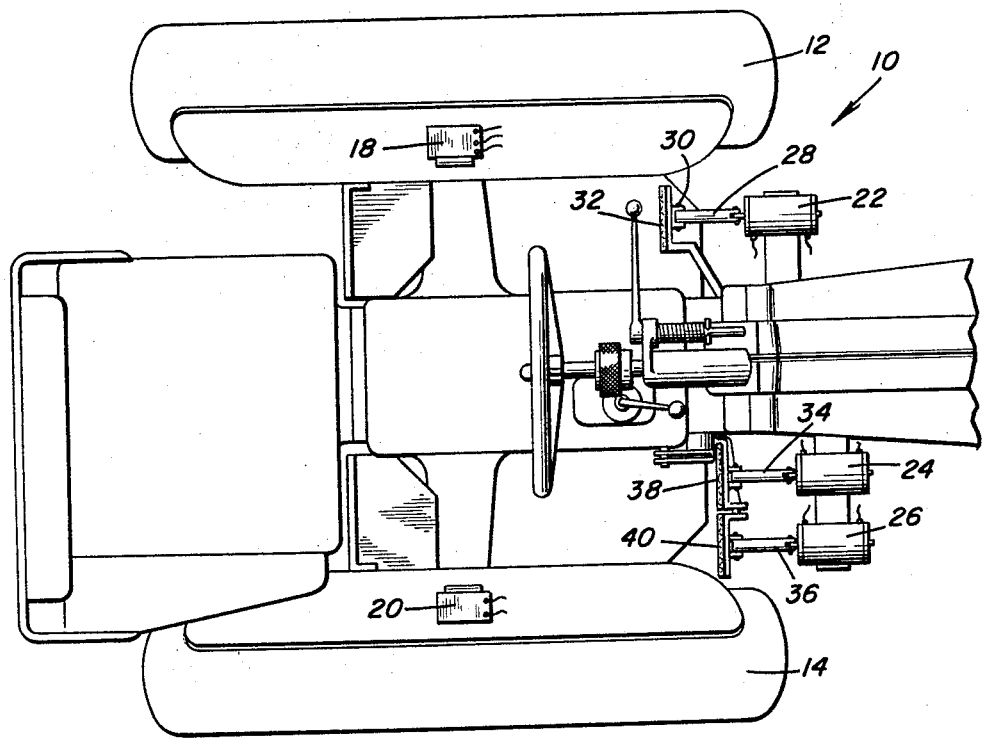
Figure 1 is a plan view of a portion of a tractor having the invention installed thereon.

Referring particularly to Figure 1, it will be noted that mounted on the vehicle are solenoids 22, 24 and 26. The solenoid 22 is adapted to actuate a plunger connected by a suitable linkage 28 or by hydraulic means to the solenoid 22 and also pivotally attached as at 30 to the clutch pedal 32 of the vehicle. Likewise, the plungers of the solenoids 24 and 26 are connected to links 34 and 36 respectively which in turn are pivotally connected to brake pedals 38 and 40 of the brake actuating mechanisms for the wheels 12 and 14 respectively. The solenoids and pedals are illustrated in Figure 1 in their energized and operative positions.

Figure 6:
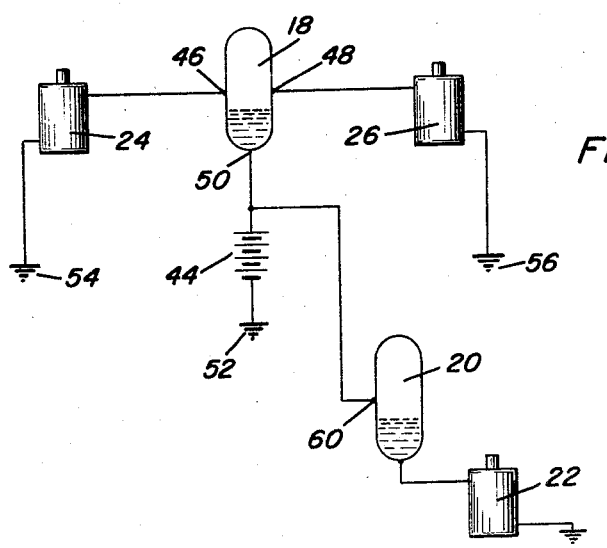
Figure 6 is a circuit diagram of the components of the invention.

As is shown in Figure 6, the various electrical components may be connected so as to complete operative electrical circuits from the battery 44 of the vehicle to the solenoids 22, 24 and 26. In the arrangement as is shown in Figure 6, the mercury switch 18 is provided with a pair of side contacts 46 and 48 as well as a base contact 50 which is connected to the battery 44, the battery being connected to ground as at 52. Each of the solenoids 24 and 26 is connected to ground as at 54 and 56. Hence, when the vehicle is driving along too steep a bank for safety, the mercury switch 18 will tilt. As is shown in Figure 6, an operative electrical circuit is completed from the base contact 50 to the side contact 48 whereby the solenoid 26 will become excited, stopping the wheel 14 and causing a changed direction and hence change the center of balance of the tractor 10. Though not illustrated in the drawings, the tractor may utilize castered front wheels for facilitating the turning of the tractor when a single ground wheel is driving. Further, in order to prevent splashing within the mercury switches during normal operation of the tractor, baffle means may be optionally provided within the switch to protect the terminals.

Figure 3:
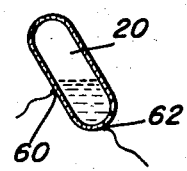
Figure 3 is a schematic diagram illustrating the position of one of the mercury switches when the vehicle has tilted.

As is shown in Figure 3, the mercury switch 20 is provided with a rear contact 60 as well as a base contact 62, the base contact being connected to the solenoid 22 while the back contact 60 is connected to the battery 44. Hence, should the tractor tilt as is shown in Figure 2, an operative electric circuit will be completed from the battery 44 to the solenoid 22 to excite the solenoid, disengaging the clutch and stopping further operation of the tractor.

It is possible to operatively connect the solenoids 24 and 26 so as to be further controlled by the switch 20 being connected in series with the solenoid 22 so that both solenoids 22 and 24 will be excited if the switch 20 were to be closed. This is accomplished by means of conductors which are connected between the switch 20 and ground to the solenoids 24 and 26.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A safety device for use on a tractor having a clutch and separately actuated brake mechanism for each wheel comprising a mercury switch, said mercury switch being normally open, said mercury switch being mounted on a tractor and rocking with said tractor, said mercury switch having a base contact connected to a battery, a pair of solenoids for separately actuating said brake mechanism, said mercury switch including an opposed pair of side contacts, said solenoids being connected to said side contacts so that when tractor rocks sufficiently an operative electrical circuit is completed from said battery to one of said solenoids.

2. A safety device for use on a tractor having a clutch and separately actuated brake mechanism for each wheel comprising a mercury switch, said mercury switch being normally open, said mercury switch being mounted on a tractor and rocking with said tractor, said mercury switch having a base contact connected to a battery, a pair of solenoids for separately actuating said brake mechanism, said mercury switch including an opposed pair of side contacts, said solenoids being connected to said side contacts so that when said tractor rocks sufficiently an operative electrical circuit is completed from said battery to one of said solenoids, a third solenoid controlling said clutch, a second mercury switch mounted on said tractor and tiltable therewith, said second mercury switch being operatively connected to said battery and said solenoid to complete an electrical circuit energizing said solenoid when said tractor is tilted sufficiently.

3. A safety device for use on a tractor having a clutch and separately actuated brake mechanism for each wheel comprising a switch, said switch being normally open and being mounted on said tractor for rocking from side-to-side therewith and for movement, upon predetermined rocking movement of the tractor in either direction, to one of two closed positions, means connected to said brake mechanism for separately braking the driving wheels of the tractor, the last mentioned means being connected to said switch for imparting a braking action to the down-hill driving wheel when the tractor is on a side slope of such gradient as to impart a rocking action thereto sufficient to position said switch in one of its two positions.

References Cited in the file of this patent

UNITED STATES PATENTS

| | | |
|---|---|---|
| 1,414,082 | Hall | Apr. 25, 1922 |
| 1,594,484 | Anderson | Aug. 3, 1926 |
| 1,980,033 | Brown | Nov. 6, 1934 |
| 2,208,016 | Cowles | July 16, 1940 |
| 2,233,192 | Armington | Feb. 25, 1941 |
| 2,354,687 | Keith et al. | Aug. 1, 1944 |
| 2,616,658 | Dombeck | Nov. 4, 1952 |
| 2,757,749 | Cooper et al. | Aug. 7, 1956 |
| 2,774,835 | Staley | Dec. 18, 1956 |